(12) United States Patent
Meckler et al.

(10) Patent No.: US 6,509,823 B2
(45) Date of Patent: Jan. 21, 2003

(54) ELECTRICAL FUNCTIONAL UNIT, IN PARTICULAR A CIRCUIT-BREAKER, FOR USE IN AVIATION

(75) Inventors: Peter Meckler, Hohenstadt/Pommelsbrunn (DE); Horst Ellenberger, Altdorf (DE); Ewald Schneider, Offenhausen (DE); Lothar Hofmeister, Neumarkt/Opf. (DE)

(73) Assignee: Ellenberger & Poensgen GmbH, Nuremberg (GB)

( * ) Notice: Subject to any disclaimer, the term of this patent is extended or adjusted under 35 U.S.C. 154(b) by 0 days.

(21) Appl. No.: 10/166,475

(22) Filed: Jun. 10, 2002

(65) Prior Publication Data

US 2002/0171531 A1 Nov. 21, 2002

Related U.S. Application Data

(63) Continuation of application No. PCT/EP00/08336, filed on Aug. 26, 2000.

(51) Int. Cl.$^7$ ............... H01H 45/02; H01H 13/705; H01H 13/04; H02B 1/044
(52) U.S. Cl. ............ 337/112; 337/327; 337/380; 337/398; 337/414; 200/296; 200/293; 200/294; 361/647; 361/652; 361/673
(58) Field of Search ............... 337/112, 20, 34, 337/66, 121, 186, 327, 380, 398, 414; 200/296, 339, 341, 293, 294; 361/627, 628, 643, 647, 652, 673

(56) References Cited

U.S. PATENT DOCUMENTS

| | | | |
|---|---|---|---|
| 3,500,282 A | | 3/1970 | Slagg |
| 3,560,672 A | * | 2/1971 | Ludlum et al. ........... 200/11 D |
| 3,776,049 A | * | 12/1973 | Emery ..................... 200/523 |
| 3,852,557 A | * | 12/1974 | Brown ..................... 200/241 |
| 3,898,402 A | * | 8/1975 | Ford ........................ 200/409 |
| 4,045,637 A | * | 8/1977 | Mongeau ................. 200/11 R |
| 4,054,860 A | * | 10/1977 | Henderson et al. ........ 200/565 |
| 4,078,405 A | * | 3/1978 | Steinbach .................. 70/441 |
| 4,154,997 A | * | 5/1979 | Grebner et al. ............ 200/277 |
| 4,191,036 A | * | 3/1980 | Steinbach .................. 70/404 |
| 4,225,764 A | * | 9/1980 | Buttner ..................... 200/518 |
| 4,335,287 A | * | 6/1982 | Aschenbach et al. .... 200/302.3 |
| 4,370,528 A | * | 1/1983 | Aschenbach ............ 200/302.3 |
| 4,400,677 A | | 8/1983 | Cobb, III et al. |
| 4,419,546 A | * | 12/1983 | Arthur ..................... 200/11 G |
| 4,440,368 A | * | 4/1984 | Kitchen .................... 248/27.1 |
| 4,499,352 A | * | 2/1985 | Fujita et al. ............... 200/296 |
| 4,673,780 A | * | 6/1987 | Kenway ................. 200/302.2 |
| 4,742,187 A | * | 5/1988 | Sorenson .................. 200/11 J |
| 4,762,509 A | * | 8/1988 | Schaefer ................... 337/195 |

(List continued on next page.)

FOREIGN PATENT DOCUMENTS

| | | |
|---|---|---|
| DE | 2 123 765 | 5/1972 |
| DE | 89 04 063.5 U1 | 8/1989 |
| DE | 40 40 481 C1 | 2/1992 |
| FR | 2.067.954 | 8/1971 |
| WO | WO 9723934 A1 * | 7/1997 ........... H02B/1/044 |

Primary Examiner—Anatoly Vortman
(74) Attorney, Agent, or Firm—Laurence A. Greenberg; Werner H. Stemer; Ralph E. Locher

(57) ABSTRACT

An electrical functional device for use in the field of aviation, for example, a safety switch, is described. The functional device has a housing out of which a cylindrical fixing neck projects. The fixing neck contains, on an outer circumference thereof, a fine-pitch threading for screwing on a nut, and carries, at a distance from the end thereof that is attached to the housing, a radially protruding bearing flange. The bearing flange serves to hold the device in a fixed position, in which the fixing neck projects through a fastening hole of a wall element and is held therein against the bearing flange by a nut. The fixing neck is a one-piece part made out of plastic. It contains, between the end of the threading thereof and the bearing flange, an unthreaded shaft area, which is coaxial in relation to the fixing neck.

7 Claims, 5 Drawing Sheets

U.S. PATENT DOCUMENTS 5,006,677 A * 4/1991 Smith et al. ................ 200/306
5,045,655 A * 9/1991 Ludwig et al. ............. 200/296
5,184,490 A * 2/1993 Takahashi ............... 200/43.06
5,373,132 A * 12/1994 Achermann et al. ........ 200/310
5,928,538 A * 7/1999 Thivet ........................ 219/264
6,255,612 B1 * 7/2001 Campana ................... 200/296

* cited by examiner

ELECTRICAL FUNCTIONAL UNIT, IN PARTICULAR A CIRCUIT-BREAKER, FOR USE IN AVIATION

CROSS-REFERENCE TO RELATED APPLICATION

This application is a continuation of copending International Application No. PCT/EP00/08336, filed Aug. 26, 2000, which designated the United States and was not published in English.

BACKGROUND OF THE INVENTION

FIELD OF THE INVENTION

The invention relates to an electrical functional unit, in particular a circuit-breaker, for use in aviation. The functional unit has a housing from which there projects an essentially cylindrical fixing neck which has around its circumference at its free end, which is directed away from the housing, a fine thread onto which a nut can be screwed. The fixing neck bears, at its end that is directed toward the housing, a radially projecting abutment flange with an annular flank as an abutment surface which is normal to the longitudinal axis of the fixing neck. The fixing neck serves for securing the unit in a fixing position, in which it projects through a fastening hole or through a fastening bore of a wall element or panel and can be braced therein against the abutment flange by the screwed-on nut. Such functional units, in particular circuit-breakers, are known, for example, from German Patent DE 2 123 765, German Patent DE 40 40 481 C1, German Utility Model DE 8 904 063 U, U.S. Pat. No. 4,400,677 or Published, French Patent Application FR 2 067 954.

Such electrical functional units, in particular circuit-breakers, are often fixed within a wall element or wall panel by a threaded-neck fastening. Usually located within the threaded neck is a functional part, e.g. an actuating handle or a display device, which projects outward from the housing and can be actuated from the outside or is visible from the outside. For strength-related reasons, the fixing neck here, which forms a separate part and is not integrated in the housing, is formed of a metallic material, e.g. steel, brass or aluminum. These materials are all electric conductors and thus give rise to an insulation problem that requires additional configuration outlays to overcome. Furthermore, the high relative density of the metal parts gives rise to a weight problem that is significant, in particular, in the case of an aircraft. This is because the fixing neck alone forms up to 10% of the overall weight of the functional unit. Nowadays, up to 800 such circuit-breakers are used in a large-capacity aircraft.

Furthermore, the secureness of the threaded-neck fixing on the wall element or wall panel has to meet high strength-related requirements that, so it was thought, up until now, could only be ensured by a metallic configuration of the fixing necks.

SUMMARY OF THE INVENTION

It is accordingly an object of the invention to provide an electrical functional unit, in particular a circuit-breaker, for use in aviation which overcomes the above-mentioned disadvantages of the prior art devices of this general type, which are of a relatively lightweight configuration without the strength of the threaded-neck fixing being adversely affected as a result.

With the foregoing and other objects in view there is provided, in accordance with the invention, an electrical functional unit. The functional unit contains a housing and a separate, one-piece, plastic cylindrical fixing neck projecting from the housing. The cylindrical fixing neck has a longitudinal axis, a circumference, a first free end directed away from the housing, and a fine thread disposed around the circumference at the first free end and onto the fine thread a nut can be screwed. The fine thread contains a given core diameter, a nominal diameter, and a fine-thread base having a rounded portion with a radius. The fixing neck has a second end directed towards the housing and a radially projecting abutment flange with an annular flank as an abutment surface being normal to the longitudinal axis of the fixing neck and formed in a region above the second end. The cylindrical fixing neck serves for securing the electrical functional unit in a fixing position, in which the electrical functional unit projects through a fastening bore of a wall element and can be braced therein against the radially projecting abutment flange by a screwed-on nut. The cylindrical fixing neck is connected to the housing in a region between the radially projecting abutment flange and the second end. A thread-free, circumferentially cylindrical shank region is formed coaxial with the longitudinal axis and disposed between the fine thread and the radially projecting abutment flange. The thread-free, circumferentially cylindrical shank region has an external diameter substantially equivalent to the given core diameter of the fine-thread. The thread-free, circumferentially cylindrical shank region has an end with a rounded portion merging with the radially projecting abutment flange. The rounded portion is formed substantially as a quarter-circle arc in cross section. The rounded portion has a radius corresponding to half a difference between the nominal diameter of the fine thread and the external diameter of the thread-free, circumferentially cylindrical shank region. The fine thread merges, without any thread runout, into the thread-free, circumferentially cylindrical shank region by way of the radius of the rounded portion of the fine-thread base.

The replacement, provided by the solution, of the conventional fixing neck, produced from a metallic material, by a fixing neck produced from plastic is only apparently obvious. This is because a considerable strength-related problem is posed by the transitions from the fixing-neck thread into the thread-free, essentially cylindrical shank region and from the shank region into the abutment flange of the fixing neck. These transition regions have a decisive influence on the strength and secureness of the unit fixing on the wall panel or wall element. Tests have shown this. Of considerable importance here are the dimensioning of the external diameter of the essentially cylindrical shank region between the threaded part of the fixing neck and the abutment flange as well as the configuration and dimensioning of the transition region of the thread-free, essentially cylindrical shank region into the abutment flange. The dimensions given in the claims in this respect have proven significant for the increase in strength and thus make it possible for the fixing neck to be produced from plastic instead of the hitherto conventional metallic material.

Producing the fixing neck from plastic makes it possible for the fixing neck to be configured as a single-piece, integral multifunctional component that may thus additionally contain a rotation-prevention device in relation to the wall panel. The rotation-prevention device being formed by a separate, discrete component in the case of the conventionally metallic fixing neck. The insulating covering further provided here serves for shielding in the outward direction of the live inner parts of the electrical functional unit.

In accordance with an added feature of the invention, the thread-free, circumferentially cylindrical shank region has an axial length of at least a sum of radii of the rounded portions corresponding to transition regions from the fine thread into the thread-free, circumferentially cylindrical shank region and from the thread-free, circumferentially cylindrical shank region into the radially projecting abutment flange.

In accordance with a further feature of the invention, an axial protrusion is provided and has a radially outer end that flanks an outer side of the fine thread, and the axial protrusion is disposed with a radial spacing from the fine thread. The axial protrusion functions as a rotation-prevention device that acts in relation to the wall element in an installed position. The axial protrusion device is formed integrally with the cylindrical fixing neck.

In accordance with an additional feature of the invention, the insulating coverings project radially beyond the cylindrical fixing neck on two diametrically opposite circumferential regions of the second end of the cylindrical fixing neck. The insulating covers are positioned within an interior of the housing when the cylindrical fixing neck has been actively installed on the housing. The insulating covers are formed integral with the cylindrical fixing neck and have a planar extent oriented at right angles to the longitudinal axial of the cylindrical fixing neck.

In accordance with another feature of the invention, the cylindrical fixing neck is formed from a plastic material having a high mechanical strength over a large temperature range, and is polyester imide, liquid crystal polymers, tetrafluorethylene/ethylene copolymers, polyphenylene sulfide, polyamide imide or polyimide.

In accordance with a concomitant feature of the invention, the fixing neck is molded onto the housing and the electrical function unit is a circuit-breaker for use in aviation.

Other features which are considered as characteristic for the invention are set forth in the appended claims.

Although the invention is illustrated and described herein as embodied in an electrical functional unit, in particular a circuit-breaker, for use in aviation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
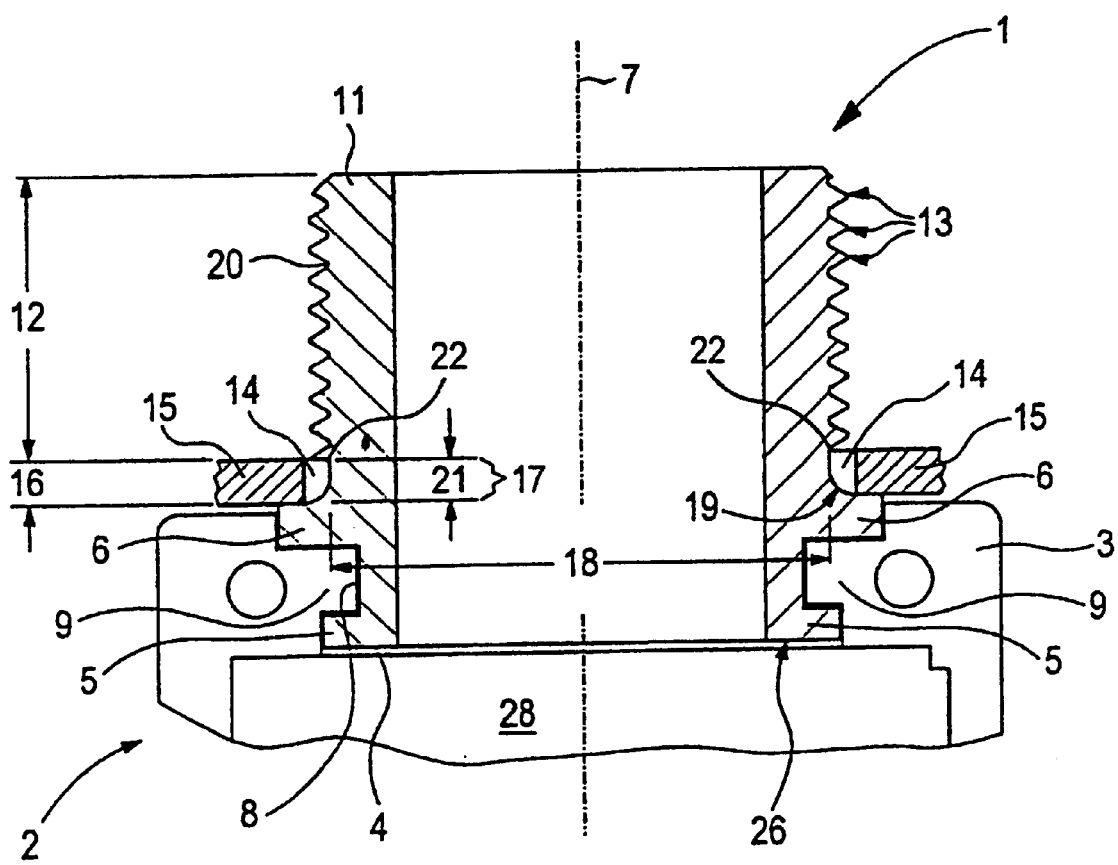
FIG. 1 is a diagrammatic, sectional view of an end of a housing shell with a fixing neck positioned therein according to the invention.

Referring now to the figures of the drawing in detail and first, particularly, to FIG. 1 thereof, there is shown a partial depiction of a housing of an electric circuit-breaker. only a housing end 3 of a housing shell 2, and an end bearing of a fixing neck 1 according to the invention, is illustrated, with a plan view of an inside 28 of the housing, which is open at the top. The fixing neck 1 is a component that is separate from the housing shell 2, that is to say from the housing, and is produced in one piece from plastic. The fixing neck 1 has, at a housing end 4, a radially projecting annular flange 5 and, in its central region, at an axial spacing from the annular flange 5, an abutment flange 6 which projects radially, to a greater extent than the annular flange 5, beyond a longitudinal axis 7 of the accommodating opening of the housing. By virtue of the axial spacing between them, the annular flange 5 and the abutment flange 6 form an annular groove 8 in the fixing neck 1. The housing shell 2 projects in a form-fitting manner, with position-fixing action, into the annular groove 8 by way of a half annular rib 9 which projects radially inward from the wall of the semicircular housing recess. Once the fixing neck 1 has been inserted into the housing recess (FIG. 1), a corresponding non-illustrated housing shell is positioned on the housing shell 2. This completes the continuous housing. The annular grove 8 of the fixing neck 1 is filled all the way round, by the half annular rib 9 of the bottom housing shell 2 and, by the corresponding half annular rib of the housing shell which is placed on top, and is not illustrated here.

At a free end 11, which is directed away from the housing-side annular flange 5, the fixing neck 1 bears on its circumference, over its axial extent 12, a fine thread 13 onto which a non-illustrated nut can be screwed. By the nut, the fixing neck 1 and thus the housing, which is illustrated symbolically by the housing shell 2 and thus the housing end 3, that is to say the electrical functional unit, in particular the circuit-breaker, is fixed in a fastening hole 14 of a wall element or wall panel 15, which is only illustrated symbolically here and has a wall thickness 16.

When the fixing neck 1, or the housing 2, 3 connected to it, is installed on the wall element or wall panel 15, i.e. with the fixing nut screwed onto the fine thread 13, the wall element or wall panel 15 butts axially in a braced manner against the abutment flange 6. This abutment position is illustrated in FIGS. 1 and 4–6D. In this fixing position, the fixing neck 1 has a thread-free shank region 17 positioned within the fastening hole 14 of the wall panel or wall element 15. An external diameter 18 of the thread-free shank region 17 is the same as the core diameter of the fine thread 13. That end of the thread-free shank region 17 that is directed toward the abutment flange 6 merges into the abutment flange 6 by way of a rounded portion 19. The rounded portion 19 here is formed as a quarter-circle arc in cross section. The radius of the rounded portion 19 corresponds to the difference between a nominal radius of the fine thread 13 and half the external diameter 18 of the thread-free shank region 17.

The fine thread 13 merges, without any thread runout into the thread-free, essentially cylindrical shank region 17 of the fixing neck 1 by way of the radius of a rounded portion 20 of a fine-thread base.

The thread-free shank region 17 has an axial length 21 of at least the sum of the radii of the rounded portions of the transition regions from the fine thread 13 into the thread-free shank region 17 and from the thread-free shank region 17 into the abutment flange 6 (=rounded portion 19).

Figure 2:
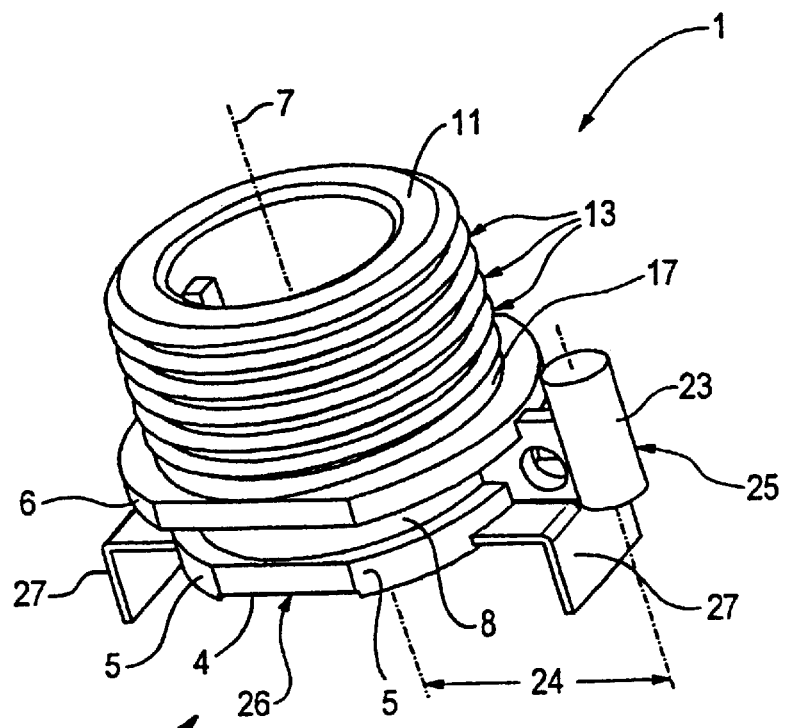
FIG. 2 is a perspective view of the fixing neck.
Figure 3:
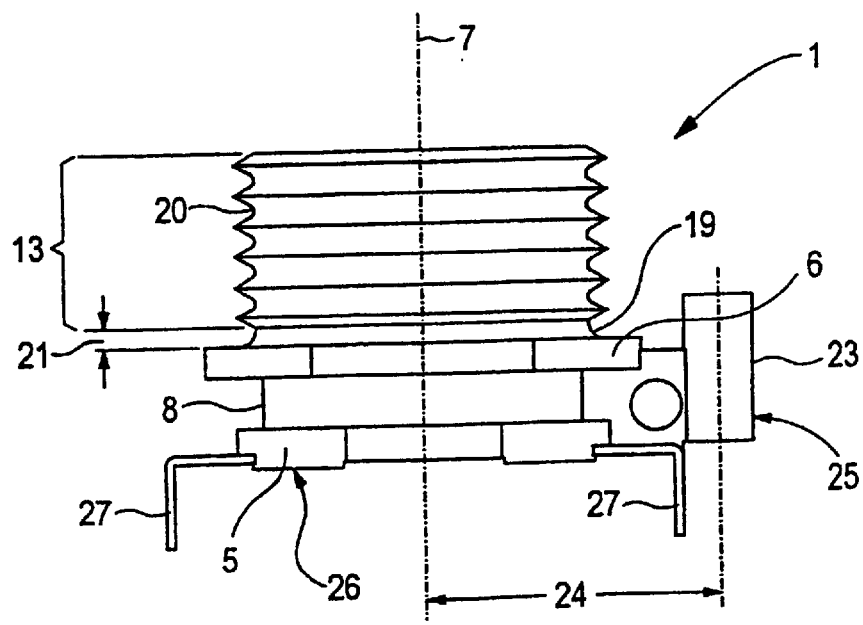
FIG. 3 is a side-elevational view shown from an arrow direction III shown in FIG. 2.
Figure 4:
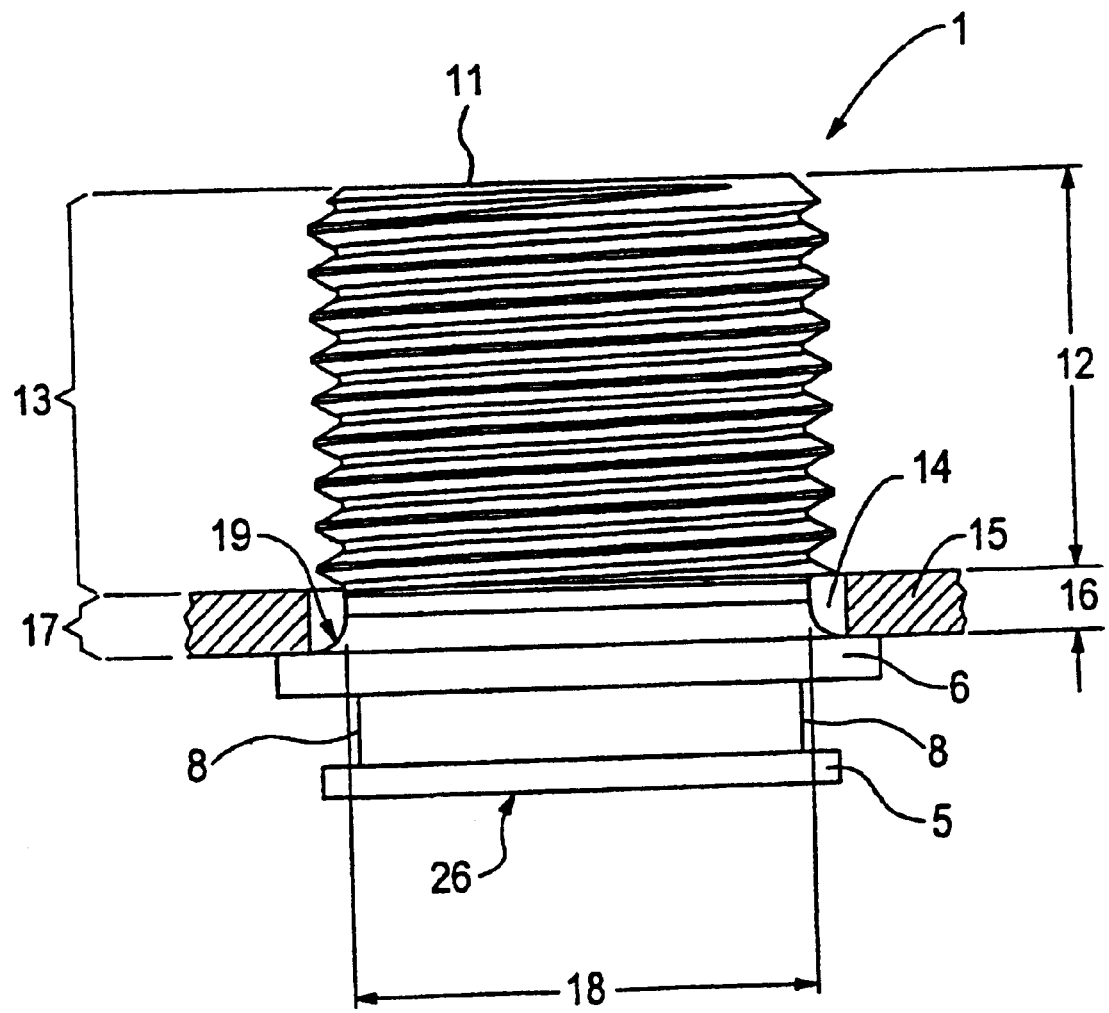
FIG. 4 is a side-elevational view of the fixing neck with dimensions that are essential to the invention being indicated.
Figure 5:
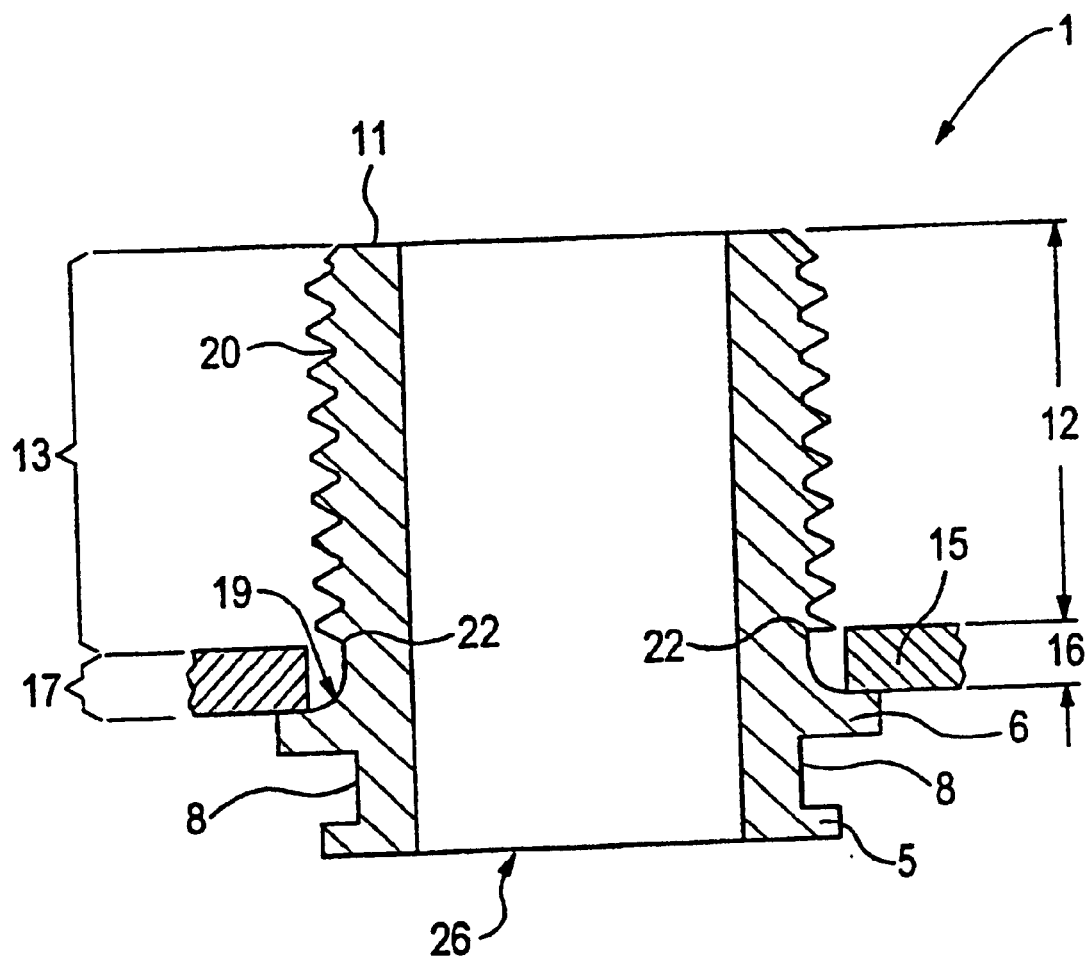
FIG. 5 is a sectional view analogous to FIG. 3, which shows schematically a positional state of the fixing neck when it is installed in a wall panel.
Figure 6D:
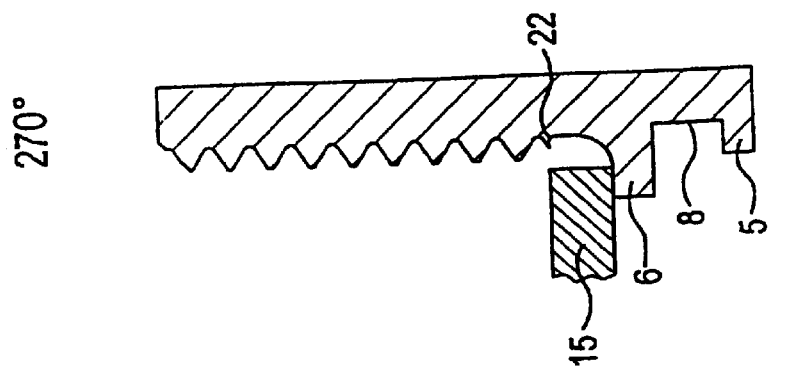
FIGS. 6A–6D are partial, sectional views of rotary positions offset through 90°, which show schematically an abutment region of an abutment flange of the fixing neck in the installed position on the abutment flange. A configuration of a transition region of the fine thread into the thread-free, cylindrical shank region is depicted as a result.
Figure 6C:
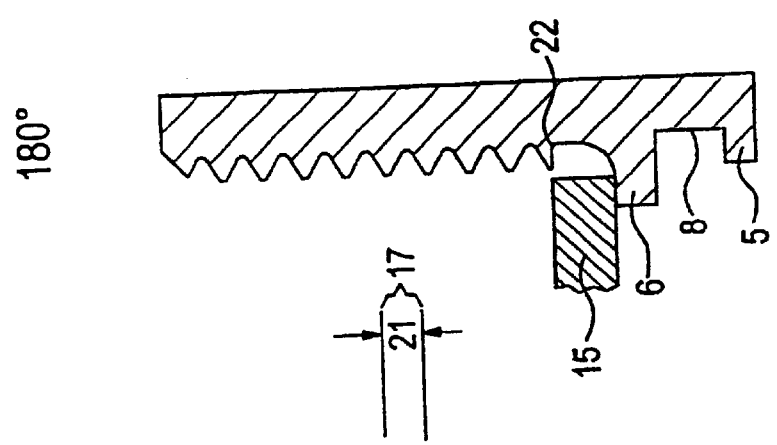
Figure 6B:
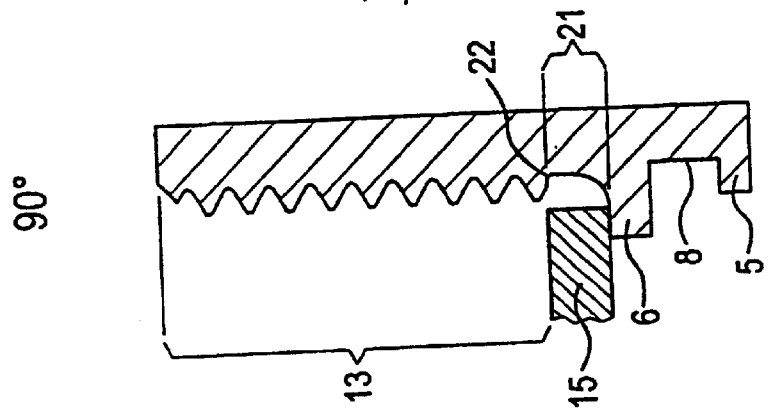
Figure 6A:
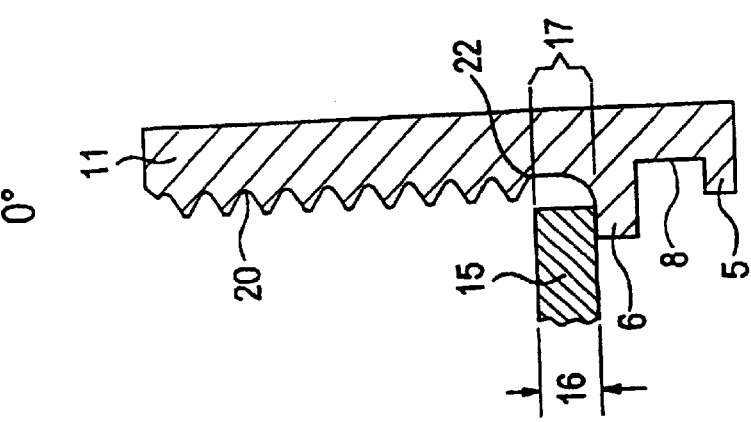

Furthermore, an axial protrusion 25 (FIGS. 2, 3) which flanks, by way of its radially outer end 23, the outside of the fine thread 13, with a radial spacing 24, and functions as a rotation-prevention device which acts in relation to the wall element or wall panel 15 in the installed position is formed integrally with the fixing neck 1.

Disposed in two diametrically opposite circumferential regions of a fastening end 26 of the fixing neck 1 are two diametrically opposite insulating coverings 27 which are integral with the fixing neck 1 and project radially beyond the fixing neck 1 at the fastening end 26. They are positioned within the housing interior 28 when the fixing neck 1 is actively installed on the housing. In the installed position, the insulating coverings 27 have their planar extent oriented at right angles to the longitudinal axis 7 of the fixing neck 1. They are of such a thin wall thickness that they fit closely against the inner walls of the interior 28 of the housing 2, 3.

The material used for the fixing neck 1 is a plastic that has high mechanical strength, such as polyester imide (PEI), liquid crystal polymers (LCP), tetrafluorethylene/ethylene copolymers (ETFE), polyphenylene sulfide (PPS), polyamide imide (PAI) or polyimide (PI).

It is also possible for the fixing neck 1, in the position illustrated, to be molded integrally onto a housing part.

We claim:

1. An electrical functional unit, comprising:
 a housing; and
 a separate, one-piece, plastic cylindrical fixing neck projecting from said housing, said cylindrical fixing neck, including:
  a longitudinal axis;
  a circumference;
  a first free end directed away from said housing;
  a fine thread disposed around said circumference at said first free end and onto said fine thread a nut can be screwed, said fine thread containing a given core diameter, a nominal diameter, and a fine-thread base having a rounded portion with a radius;
  a second end directed towards said housing;
  a radially projecting abutment flange with an annular flank as an abutment surface being normal to said longitudinal axis of said fixing neck and formed in a region above said second end, said cylindrical fixing neck serving for securing the electrical functional unit in a fixing position, in which the electrical functional unit projects through a fastening bore of a wall element and can be braced therein against said radially projecting abutment flange by a screwed-on nut, said cylindrical fixing neck connected to said housing in a region between said radially projecting abutment-flange and said second end; and
  a thread-free, circumferentially cylindrical shank region formed coaxial with said longitudinal axis and disposed between said fine thread and said radially projecting abutment flange, said thread-free, circumferentially cylindrical shank region having an external diameter substantially equivalent to said given core diameter of said fine-thread, said thread-free, circumferentially cylindrical shank region having an end with a rounded portion merging with said radially projecting abutment flange, said rounded portion formed substantially as a quarter-circle arc in cross section, said rounded portion having a radius corresponding to half a difference between said nominal diameter of said fine thread and said external diameter of said thread-free, circumferentially cylindrical shank region, and said fine thread merging, without any thread runout, into said thread-free, circumferentially cylindrical shank region by way of said radius of said rounded portion of said fine-thread base.

2. The unit according to claim 1, wherein said thread-free, circumferentially cylindrical shank region has an axial length of at least a sum of radii of said rounded portions corresponding to transition regions from said fine thread into said thread-free, circumferentially cylindrical shank region and from said thread-free, circumferentially cylindrical shank region into said radially projecting abutment flange.

3. The unit according to claim 1, further comprising an axial protrusion having a radially outer end that flanks an outer side of said fine thread, and said axial protrusion disposed with a radial spacing from said fine thread, said axial protrusion functioning as a rotation-prevention device which acts in relation to the wall element in an installed position, said axial protrusion is formed integrally with said cylindrical fixing neck.

4. The unit according to claim 1, further comprising an insulating coverings projecting radially beyond said cylindrical fixing neck on two diametrically opposite circumferential regions of said second end of said cylindrical fixing neck, said insulating covering positioned within an interior of said housing when said cylindrical fixing neck has been actively installed on said housing, said insulating covering formed integral with said cylindrical fixing neck and have a planar extent oriented at right angles to said longitudinal axis of said cylindrical fixing neck.

5. The unit according to claim 1, wherein said cylindrical fixing neck is formed from a plastic material having a high mechanical strength over a large temperature range, and selected from the group consisting of polyester imide, liquid crystal polymers, tetra-fluorethylene/ethylene copolymers, polyphenylene sulfide, polyamide imide and polyimide.

6. The unit according to claim 1, wherein said cylindrical fixing neck is molded onto said housing.

7. The electrical functional unit according to claim 1, wherein the electrical function unit is a circuit-breaker for use in aviation.

\* \* \* \* \*